(12) United States Patent
Dyrli et al.

(10) Patent No.: US 7,397,530 B2
(45) Date of Patent: Jul. 8, 2008

(54) METHOD FOR ENCAPSULATION OF LIQUID CRYSTALS WITH A NARROW CAPSULE SIZE RANGE

(75) Inventors: Anne Dalager Dyrli, Trondheim (NO); Ruth Baumberger Schmid, Tiller (NO); Cecilie Kristiansen, Skedsmokorset (NO); Jan K. Nielsen, Oslo (NO); Maxim Miltrokhin, Horten (NO); Lorenzo Williams, Oslo (NO)

(73) Assignee: Polydisplay ASA, Sandefjord (NO)

( * ) Notice: Subject to any disclaimer, the term of this patent is extended or adjusted under 35 U.S.C. 154(b) by 81 days.

(21) Appl. No.: 10/553,912

(22) PCT Filed: Jul. 14, 2005

(86) PCT No.: PCT/NO2004/000008

§ 371 (c)(1),
(2), (4) Date: Jul. 21, 2006

(87) PCT Pub. No.: WO2004/063309

PCT Pub. Date: Jul. 29, 2004

(65) Prior Publication Data

US 2007/0023732 A1 Feb. 1, 2007

(30) Foreign Application Priority Data

Jan. 14, 2003 (NO) .................................. 20030185

(51) Int. Cl.
*G02F 1/13* (2006.01)
*C09K 3/00* (2006.01)

(52) U.S. Cl. ........................ 349/187; 349/188; 349/189; 349/190; 252/299.01

(58) Field of Classification Search ............ 349/90, 349/89, 86, 91, 187, 188, 189, 190, 191, 349/192, 193; 252/299.01
See application file for complete search history.

(56) References Cited

U.S. PATENT DOCUMENTS

| | | | | |
|---|---|---|---|---|
| 4,435,047 A | | 3/1984 | Fergason | 350/349 |
| 5,976,405 A | | 11/1999 | Clikeman et al. | 252/294.01 |
| 6,160,061 A | | 12/2000 | Berge | 526/78 |
| 6,249,271 B1 | * | 6/2001 | Albert et al. | 345/107 |
| 6,262,706 B1 | * | 7/2001 | Albert et al. | 345/107 |
| 6,515,649 B1 | * | 2/2003 | Albert et al. | 345/107 |
| 2003/0025855 A1 | * | 2/2003 | Holman et al. | 349/86 |
| 2003/0129247 A1 | * | 7/2003 | Ju et al. | 424/490 |

FOREIGN PATENT DOCUMENTS

| | | | | |
|---|---|---|---|---|
| EP | 00204537 | 12/1986 | | 349/89 X |
| EP | 0915147 | 5/1999 | | 349/89 X |
| JP | 2002-090716 | 3/2002 | | 349/89 X |

OTHER PUBLICATIONS

Clikeman RR et al, "Monodisperse polymeric particles with liquid crystalline cores" AM-LCD Digest of Technical Papers. International workshop on Active-MaAtrix Liquid-Crystal Displays in COnjunction with IDW 1996, pp. 169-172.

* cited by examiner

*Primary Examiner*—Brian M Healy
(74) *Attorney, Agent, or Firm*—Christian D. Abel

(57) ABSTRACT

This invention relates to a method for encapsulation of liquid crystals to form spherical particles with a narrow size distribution. More specific, this invention relates to a method for encapsulation of liquid crystals that are suitable to be employed in liquid crystal displays, including displays intended to be used in large boards outdoors.

7 Claims, No Drawings

METHOD FOR ENCAPSULATION OF LIQUID CRYSTALS WITH A NARROW CAPSULE SIZE RANGE

This invention relates to a method for encapsulation of liquid crystals to form spherical particles with a narrow size distribution. More specifically, this invention relates to a method for encapsulation of liquid crystals that are suitable to be employed in liquid crystal displays, including displays intended to be used in large boards outdoors.

BACKGROUND

Liquid crystals (LCs) are currently used in a wide variety of devices, including optical devices such as information displays, including but not limited to computer screens, wristwatches, projection display devices, etc.

Generally, thermotropic liquid crystals, that is, materials with liquid crystal properties at specific temperature intervals, consist of molecules with a rod-like shape with flexible tails or with a disk-like shape. Liquid crystals simultaneously exhibit properties such as optical and electrical anisotropy of a solid crystal and fluidity of a liquid. The liquid crystal molecules have a tendency to align themselves along a common axis called the director in contrast to molecules in an isotropic (ordinary) liquid which has no intrinsic order. In the crystalline solid phase, the molecules are highly ordered and have little translational freedom. Due to the polarity of the LC-molecules, they can be ordered to point along a common director by imposing an electric or magnetic field, and the optical properties of the anisotropic liquid crystal may be manipulated accordingly.

Liquid crystals can have several molecular structures, which may be divided into three main mesophases, depending on the type of ordering within the molecular structure: Nematic, smectic and cholesteric. The nematic mesophase is the least ordered one and is characterised in that the molecules have no positional order but tend to point in the same direction. The cholesteric mesophase is very close to the nematic phase (known as the chiral nematic phase), but the director will form a helix within the material. The smectic phase is the most ordered one and is characterised in that the molecules tend to align themselves in layers, in which they may have various types of directional and transitional order. There are a total of 12 smectic mesophases identified that are different in the degree and type of order within the layers. The most important from the point of view of display application are the smectic A and smectic C. Generally, the physiochemical properties of a thermotropic liquid crystal will allow the material to exhibit several of the mesophases mentioned above within different temperature intervals.

Most liquid crystal displays are based on the ability of a liquid crystal to change the polarisation state of light. Such displays are commonly referred to as twisted nematic or super twisted nematic displays. More recently Bragg reflection in cholesteric displays has been utilised to produce reflective displays. Other liquid crystal displays are scattering and partially reflective due to steps in the index of refraction at LC domain boundaries within the display. The domains may be focal conic domains as is the case for EASL (electrically addressed smectic liquid crystal) displays or they may be liquid crystal spheres dispersed in an index-matched polymer (Polymer Dispersed Liquid Crystal or PDLC). The domains may also be encapsulated spheres with hard shells that again need to be dispersed in some index-matched medium as mentioned in U.S. Pat. No. 4,435,047. While nematic spheres are described as a single domain with a corresponding single domain wall towards the polymer matrix, smectic spheres may consist of several focal conic domains causing an improved optical scatter efficiency.

One interesting and useful characteristic for liquid crystal optical devices is that of the optical state stability. Most displays based on nematic liquid crystals, i.e., TN (twisted nematic), STN (super twisted nematic), and PDLC, are known to be monostable, that is, they will return to their original molecular configuration when the externally imposed force field such as an electric field, has been removed. The EASL display based on a smectic A liquid crystal is bistable and will thus retain its written image after the imposing force (electric field) is switched off. The same bistability is also available for some other display technologies, e.g., the cholesteric reflective display. This is a useful property for information displays which are intended to contain the same information for long periods of time.

The concept of a reflective liquid crystal display technology is particularly useful in situations with strong ambient light, e.g., outdoors in sunlight, where backlit displays effectively have no contrast, i.e., there is little difference between the perceived levels of black and white.

The concept of a bistable display is particularly useful when high resolution is required, since monostable technologies then rely on active switching elements at each picture element (pixel), which imply high production costs. The bistability may also imply low power consumption depending on (1) the energy required to switch the liquid crystal structure, (2) the time between updates, and (3) the power consumption of internal light sources.

Addition of polymer to LC has several features, as such combined materials possess properties both of LC and polymer. First of all, a polymer matrix can offer a flexible host for the liquid crystal. This means that rigid substrates such as glass etc. are not required, but flexible ones can be used such as for example indium tin oxide (ITO) coated polyesters. Secondly, the production of displays on the basis of the LC-polymer mixture is simpler and larger sizes of substrates can be used. The introduction of the polymer can also lead to new electro-optical effects (e.g. scattering in nematic polymer dispersed LCs), to obtain the stability of optical states (e.g. polymer stabilised cholesteric LC) and improved grey scale—the ability of the display to have intermediate optical states (e.g. polymer stabilised ferroelectric LC). Yet, such materials also have some disadvantages. Usually the introduction of a polymer into the LC leads to an increase in the driving voltage, i.e. voltage that is necessary to obtain a change in the optical state of the display. The degree of increase depends on the using electro-optical effect. One other disadvantage is that part of the LC volume is occupied by an optically non-active polymer, which will lead to decrease of the contrast.

The morphology of a LC-polymer mixture depends on the amount of polymer added. In the case of polymer stabilised liquid crystal (PSLC) the amount of polymer is less than 10 wt %. In this case a polymer network inside the LC is formed. When the amount of polymer is higher, the LC forms droplets inside the polymer phase and becomes a polymer dispersed liquid crystal (PDLC). The shape, size and size distribution of LC droplets determine the electro-optical properties of the material and depend on the preparation method of the PDLC as well as on physicochemical properties of the LC and the polymer.

The following methods of PSLC/PDLC preparation are well known by the art: Emulsification, phase separation and encapsulation. The first PDLC films were made by emulsifying an aqueous latex polymer solution, LC and surfactants until a dispersion was achieved. This emulsion was coated onto a substrate with a conductive layer and the water was evaporated. The soft rubbery layer obtained was laminated onto a second substrate. The original term for such material was Nematic Curvilinear Aligned Phase (NCAP) due to the curved arrangement of the nematic director within the droplets, but now this term is commonly used to point out the emulsification method that was used for preparation of PDLC.

The second widely used method for preparing PSLC/PDLC is a phase separation method. The phase separation of LC from polymer can be achieved by polymerisation of prepolymer (monomer or oligomer) in the mixture of LC and prepolymer (polymer induced phase separation or PIPS method). UV light is widely used to cure the prepolymer, but thermal polymerisation can be used for this purpose also. This method is good for PSLC preparation. It is possible to phase separate the LC and polymer from the LC/polymer solution in organic solvent during solvent evaporation (solvent induced phase separation or SIPS method). Phase separation can also occur by cooling a LC/polymer melt to room temperature (thermal induced phase separation or TIPS method).

However, information displays based on polymer dispersed liquid crystals offer several disadvantages. The main disadvantage of described methods for PDLC preparation is that the droplets of the liquid crystal will have a broad variety of shapes and sizes. This means that these methods will not give reproducible electro-optical properties of displays. Another disadvantage is that there will be diffuse interphase regions between LC droplets and polymer, mainly composed of liquid crystal, which has been swelled into the polymer matrix. These interphase regions will have different optical characteristics compared to the bulk material inside the liquid crystal droplets. This means the interfaces will not be sharp, thus reducing the quality of the clear and scatter state.

PRIOR ART

It is known that the problem with interphase regions between the liquid crystal and polymer phases can be reduced by encapsulating the liquid crystal in a polymer capsule such as polyvinyl alcohol or latex, instead of being dispersed in a polymer medium. An example of a such approach is given by EP 0 204 537, which presents an emulsification technique for encapsulating liquid crystal material having a smectic phase in polydisperse capsules. Here the liquid crystal is encapsulated in polyvinyl alcohol (PVA) or latex capsules with almost a spherical shape. That is, the liquid crystal material is mixed with the encapsulating material (PVA or latex), often with addition of a carrier medium such as water until an emulsion is formed. The emulsion is then dried, in order to eliminate the carrier medium and cure the encapsulating medium. The diameter of the capsules is in the range from 0,3 to 100 µm, preferably 5 to 15 µm. This technique is easy and not very expensive, but the disadvantage is the broad distribution of capsules size and the variation of shape which means poor reproducibility of display electro-optical properties.

It is also known that the problem with poor reproducibility of display electro-optical properties can be solved by controlling the size, size distribution and shape of the capsules. From U.S. Pat. No. 5,976,405 it is known that liquid crystals of nematic type can be encapsulated in monodisperse capsules by a swelling technique. The technique involves: a) combining a first emulsion comprising an organic liquid material (liquid crystal), a second emulsion comprising seed particles, and one or more ethylenically unsaturated monomers, b) forming droplets in the aqueous phase where the droplets comprise the organic liquid material and the one or more monomers, and c) polymerising the one or more monomers by free radical polymerisation to from particles where the organic liquid material is contained in a spherical polymer shell. The particles are claimed to have a polydispersity from 1.0 to 1.3.

The advantage of this encapsulation technique compared with the technique described in EP 0 204 537 is the reproducibility of the display electro-optical properties because of the narrow distribution of capsules size and shape. However, the process according to U.S. Pat. No. 5,976,405 is cumbersome and slow, and thus expensive. The swelling technique is also more sensitive towards the physiochemical properties of the materials that are to be encapsulated because all the components have to diffuse through the water phase which means the types of liquid crystal material and additives like dyes or dopants must be water-soluble to some extent. This then restricts the process to a narrow span of liquid crystal materials and additives.

The disadvantages of the techniques described in prior art show that there is a need for providing a new process or method for producing capsules containing liquid crystals with a controlled and narrow size distribution.

OBJECTIVE OF INVENTION

The objective of this invention is to provide a method for encapsulating liquid crystals in a spherical polymer shell with a narrow size distribution which solves the above mentioned problems.

Another objective of this invention is to provide a method for encapsulating liquid crystals in a spherical polymer shell with a narrow size distribution which is faster, more reliable and which is more robust with regard to which type liquid crystal being encapsulated.

SUMMARY OF THE INVENTION

The objectives of the invention can be achieved by what is described in the appended claims and following description.

The objective of this invention can be achieved by exploiting a technique which is described in U.S. Pat. No. 6,160,061 and which may be called, for short, the homogenisation technique. This technique is thoroughly described in the patent, and is hereby enclosed by reference. In short, the technique may be summarised as:

First an aqueous emulsion with a narrow droplet size distribution of an oily material comprising one or more highly water insoluble substances is prepared. The emulsion is formed by dispersing an oily phase in an aqueous phase. The oily phase contains the different compounds necessary to make a polymer shell, e.g. one or more polymerisable monomers or one or more initiators.

The solubility of the dispersed phase in the continuous aqueous phase is controlled to make the emulsion degrade by diffusion to a chosen extent so that the droplet-size distribution becomes narrow and the mean droplet size is in the preferred range. Then the solubility is reduced by dilution/removal of the solvent, giving a more stable emulsion.

After the relatively stable emulsion has been prepared, it is possible to add a partly water soluble material, and said partly water soluble material will then become absorbed by the droplets in the emulsion. The amount of the partly water soluble material added at this stage can be up to 5000 times the volume of the oily material in the emulsion. The partly water soluble material added here may or may not be the same as the partly water soluble material used in the homogenisation.

When a partly water soluble material is subsequently added to the stabilised emulsion and absorbed by the droplets, the resulting droplets will have a similar narrow size distribution and in the subsequent polymerisation the narrow size distribution is essentially retained.

If both initiator and monomer are present in the oily phase the polymerisation may be carried out directly after stabilisation of the emulsion. If none or just one of the two compounds is present during homogenisation, the other(s) may be added to the stabilised emulsion and polymerisation may then be carried out.

The inventive step is that it has surprisingly been found that by admixing a liquid crystal material with the polymer forming material in the oily phase before emulsification, the crystal liquid material and the polymer forming material will separate during polymerisation such that spherical polymer capsules containing liquid crystalline material with a controlled and variable size and a narrow size distribution is formed. The surprising part is that even though the liquid crystalline material and the polymer forming material must have relatively similar properties in order to be dissolved in the same oily phase, they will nevertheless separate almost completely during polymerisation such that a sharp interphase region is formed between the liquid crystal and polymer phase with very little or no interphase regions. This introduction of one additional phase in the polymer particles of U.S. Pat. No. 6,160,061 gives no detrimental effects upon the narrowness of the particle size distribution, production reliability, cost effectiveness etc. That is, the obtained narrow size distribution of the capsules will give this technique an advantage over the prior art technique presented in EP 0 204 537 because of the better controllability of the display electro-optical performance at the same time as it is more flexible in regard of choice of materials to be encapsulated faster and less expensive than the swelling technique used in U.S. Pat. No. 5,976,405.

Thus the inventive method provides a method for production of encapsulated liquid crystals that solves the problems with prior art. This method is also relatively robust in regard of which liquid crystal material being encapsulated, such that it may comprise encapsulating liquid crystal materials of all known mesophases, including smectic A and C, chiral nematic, cholesteric, and nematic liquid crystals.

It is possible to form polymer particles that contain one or several liquid crystal phase(s). Also, by controlling the ratio of liquid crystal material and polymer material, one can control the thickness of the formed polymer shell and thus obtain a very favourable liquid crystal/polymer ratio in the capsules for use in optical devices.

It is also possible to employ the inventive method such that only the initiator material(s) is(are) present in the oily phase during homogenisation. That is, the oily phase comprises only the polymer forming material(s). Or vice versa, that only the polymer forming material is present during homogenisation. In this case, the initiator material(s) is(are) added after homogenisation. A third possibility is that the oily phase comprises only the liquid crystal material(s), and that both the initiator and polymer forming material(s) are added after homogenisation.

The oily phase contains mostly a liquid crystalline material, but may also contain additives like dopants and also different compounds necessary to make the polymer shell e.g. one or more polymerisable monomers or one or more initiators.

The capsules containing LC material may be used in such applications as large-area windows, optical shutters, projection displays, direct view displays, including scattering, light absorbing and light reflecting modes. The LC may be addressed electrically, magnetically or thermally and the encapsulated liquid crystal film may form part of an optical stack.

DETAILED DESCRIPTION OF THE INVENTION

The invention will now be described in more detail and an example of a preferred embodiment will be given.

The encapsulated LC may comprise a single liquid crystal or liquid crystal mixture in the presence or absence of various additives. The LC may possess various phases, sub-phases and chiral phases, but preferably has smectic properties in the temperature range in which it is supposed to be used. Additives may comprise of substances which allow for controllable absorbance as well as scatter, e.g. dichroic dyes, ionic dopants or substances which lead to an improvement in the opacity of the light-scattering state, e.g. spherical molecules, quaternary ammonium salts, chiral compounds or ortho-isomers of usual para-substitued LCs. The additives, if chiral in nature, may be used to induce chiral phases in non-chiral LCs.

To make a polymeric shell it is necessary to have an initiator and a polymerisable monomer present. The initiator and/or the monomer may be present during the preparation of the emulsion and/or added to the emulsion to be absorbed by the droplets of said emulsion depending on the water solubility of the compounds.

The monomers may be all kinds of suitable monomers, including but not limited to vinyl monomers like acrylics, methacrylics and styrenics, like MMA, BA, HEMA, GMA, St, and also crosslinking monomers like EGDMA and DVB.

The hydrophilic phase used for the preparation of the aqueous emulsion of the oily material is a mixture of water and an ordinary organic water miscible solvent. Examples of such solvents include lower alkanols, such as methanol, and lower dialkylketones, such as acetone. The composition of the hydrophilic phase is regulated after the solubility of composition of the oily phase.

An anionic emulsifier such as Aerosol OT or sodium lauryl sulphate (SLS), and sometimes a steric stabiliser such as Hypermer CG-6 from ICI must be used to obtain effective stabilisation.

Mean size of droplet diameter can be varied over a wide range from 0.5 μm to 4 μm. By addition of slightly water soluble components after the stable emulsion is prepared the size of the diameter can easily be increased by a factor of at least 10.

The degree of the droplet size distribution obtained with this method, given as the coefficient of variation (CV), which is the standard deviation divided by the mean droplet/particle size, varies from 15 to 45%.

Encapsulation liquid crystal material using the homogenisation method is described in more detail by the following experiment. The capsule size and size distribution has been determined using a Coulter Counter LS-230 instrument from Coulter Electronics.

EXAMPLE 4-cyano-4-octylbiphenyl, FR-2221 from FRINTON Labs, 5.3 grams, hexadecane, from Merck-Schuchart, 0.05 grams, and t-butyloctanoate (Trigonox 21s from Akzo) 0.05 grams, was added to a mixture of methanol and water, weight ratio 67/33 containing 0.15 grams of an emulsifier Aerosol OT. The mixture was first treated in an Ultraturrax and thereafter 5 times in a Manton Gaulin Homogeniser at a pressure of about 400 kg/cm². After homogenisation there was immediately added 200 ml water to 30 ml of the emulsion. The droplet size was measured by Coulter Counter LS-230 and it was found an average diameter of 2.41 μm with standard deviation of 0.73 μm (CV 30%).

To the stabilised emulsion, 180.5 grams, there was added a mixture of 10.0 grams water containing 0.02 grams emulsifier, Aerosol OT, and 1.8 grams acrylic monomer, MMA/EGDMA/HEMA 40/50/10, which had been homogenised in the Ultraturrax. The monomer was allowed to swell into the emulsion droplets at 25° C. for 30 minutes. Then 2.0 grams water containing 0.02 grams $NaNO_2$ was added. The temperature was raised to 85° C. and held for 1 hour and then raised to 95° C. and held for 1 hour for the polymerisation to occur. The result of the examination of the final latex by Coulter LS-230 shows capsules with mean diameter of 2.62 μm with standard deviation of 0.91 μm (CV 35%).

Even though this method has been described as a method for providing encapsulated liquid crystal materials in spherical polymer particles with a narrow size distribution which is suited to be used in optical displays, it should be understood as a general method for providing polymer particles containing one or several crystal liquid phases no matter where the polymer particles are intended to be used.

The invention claimed is:

1. A method for encapsulating liquid crystal materials in a polymeric spherical shell with a narrow size distribution, which comprises
    preparing an aqueous emulsion with a narrow size distribution of an oily phase containing a polymer forming material and an initiator material, wherein the oily phase is homogenised in a hydrophilic phase in which the oily material is more soluble than in water, but sufficiently insoluble to form an emulsion by homogenisation,
    stabilising the emulsion by diluting the aqueous phase by addition of a high portion of water, and
    polymerising the polymer forming material to form polymer particles with a narrow size distribution, characterised in that
    a liquid crystal material is dissolved into the oily phase during the preparation of the aqueous emulsion in a sufficient amount to form one or several separate phase (s) of the liquid crystal within the polymer forming material during polymerisation, such that the one or more liquid crystal phase(s) become(s) encapsulated inside the spherical polymeric particle being formed.

2. A method according to claim 1,
    characterised in that the polymer forming material is added to the oily phase after homogenisation, that is, the oily phase comprises only the liquid crystal material and the initiator material during emulsification.

3. A method according to claim 1,
    characterised in that the initiator material is added to the oily phase after homogenisation, that is, the oily phase comprises only the liquid crystal material and the polymer forming material during emulsification.

4. A method according to claim 1,
    characterised in that both the initiator material and polymer forming material are added to the oily phase after homogenisation, that is, the oily phase comprises only the liquid crystal material during emulsification.

5. A method according to claim 1,
    characterised in that the liquid crystal material may be in one of the following mesophases at ambient temperatures: nematic, cholesteric (chiral nematic), or smectic phases comprising smectic A or smectic C.

6. A method according to claim 5,
    characterised in that the polymer forming material is a monomer preferably chosen from the group of vinyl monomers comprising acrylics, methacrylics and styrenics, such as MMA, BA, HEMA, GMA, St, and crosslinking monomers like EGDMA and DVB.

7. A method according to claim 1,
    characterised in that additional and auxiliary compounds such as dopants, dyes, and/or initiators is/are added into the oily phase during the preparation of the aqueous emulsion.

* * * * *